United States Patent [19]
Obata et al.

[11] Patent Number: 5,432,868
[45] Date of Patent: Jul. 11, 1995

[54] INFORMATION MEDIUM RECOGNITION DEVICE

[75] Inventors: Kenzo Obata, Okazaki; Yoshiki Uchikawa, Nagoya; Takeshi Furuhashi, Nagoya; Shigeru Watanabe, Nagoya, all of Japan

[73] Assignee: Nippondenso Co., Ltd., Kariya, Japan

[21] Appl. No.: 65,235

[22] Filed: May 21, 1993

[30] Foreign Application Priority Data

Aug. 7, 1992 [JP] Japan .................. 4-211267

[51] Int. Cl.⁶ ............................................. G06K 9/00
[52] U.S. Cl. ................................ 382/187; 387/159; 395/61
[58] Field of Search ............. 395/900, 61, 3; 382/3, 382/13, 14, 15, 18, 34, 62

[56] References Cited

U.S. PATENT DOCUMENTS

| | | | |
|---|---|---|---|
| 4,274,542 | 2/1988 | Williford | 382/15 |
| 4,398,177 | 7/1983 | Bernhardt | 382/62 |
| 5,222,155 | 6/1993 | Delanoy et al. | 382/30 |

OTHER PUBLICATIONS

Siy et al., Fuzzy Logic For Handwritten Numeral Character Recognition, IEEE Transactions on Systems, Man and Cybernetics Nov. 1974, pp. 570–575.

"Stroke Density Feature for Handprinted Chinese Characters Recognition" by Seiichiro Naito et al; Journal of Japan Society of Electronic Communication, '81/8, vol. J64-D, No. 8; Aug., 1981; pp. 757–764 (w/partial English translation).

"A Basic Study on Signature Recognition" by Shigeru Watanabe et al; The 8th Fuzzy System Symposium Lecture Theses; May, 1992; pp. 173–176 (w/whole English translation).

Primary Examiner—Joseph Mancuso
Attorney, Agent, or Firm—Cushman, Darby & Cushman

[57] ABSTRACT

An information medium recognition device for recognizing an information medium such as a handwritten signature inputted by performing an offline input operation. The information medium recognition device is provided with a detection portion for scanning the information medium in different scanning directions and for detecting a stroke density corresponding to each of the scanning directions, an inference portion for converting the stroke density into a compressed fuzzy density by performing a fuzzy inference process on the stroke density corresponding to each scanning direction, which is detected by the detection portion, and a judgement portion for judging from the fuzzy density corresponding to each scanning direction whether or not the information medium is genuine. Thereby, the information medium recognition device has an excellent effect in that the genuineness of the information medium such as a handwritten signature can be accurately recognized and judged on the basis of data obtained as the result of the fuzzy inference processing performed by the inference portion.

17 Claims, 14 Drawing Sheets

FIG. 7(a)
*Watanabe*
SIGNATURE
FIG. 7(b)
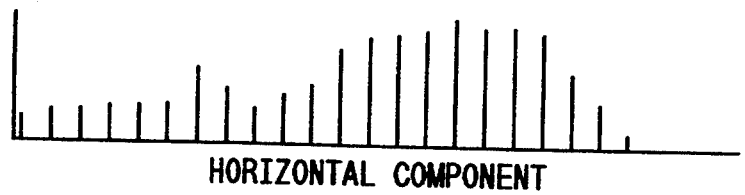
HORIZONTAL COMPONENT
FIG. 7(c)
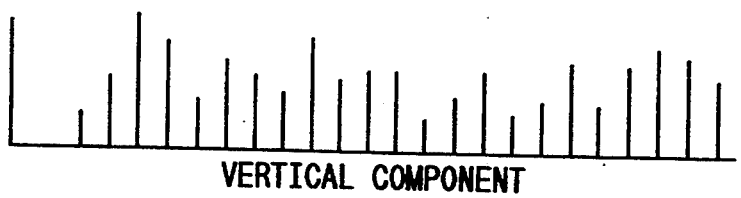
VERTICAL COMPONENT
FIG. 7(d)
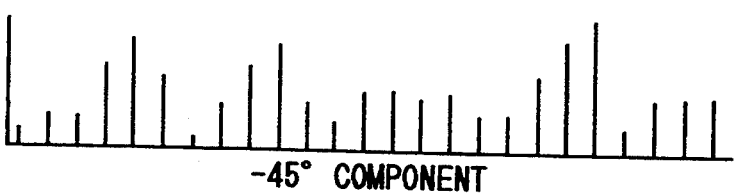
−45° COMPONENT
FIG. 7(e)
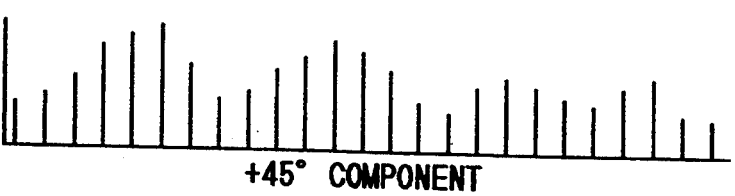
+45° COMPONENT FIG. 8(a) POSITIVE EXAMPLE
FIG. 8(b) NEGATIVE EXAMPLE
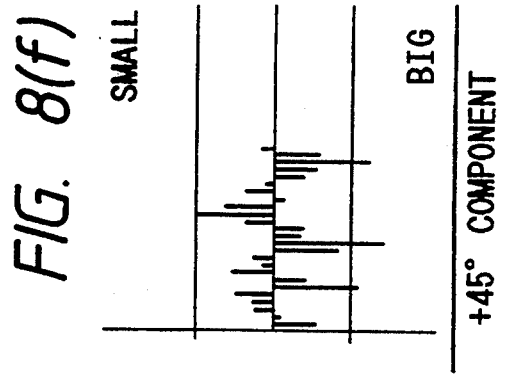
FIG. 8(c) HORIZONTAL COMPONENT
FIG. 8(d) VERTICAL COMPONENT
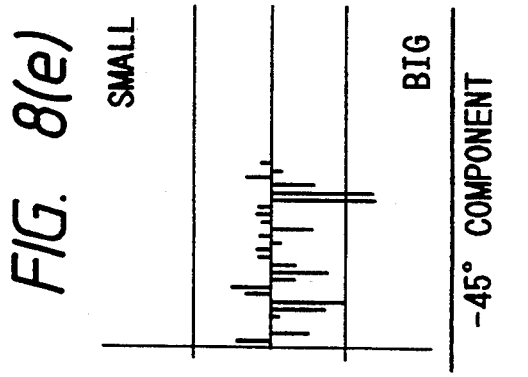
FIG. 8(e) −45° COMPONENT
FIG. 8(f) +45° COMPONENT
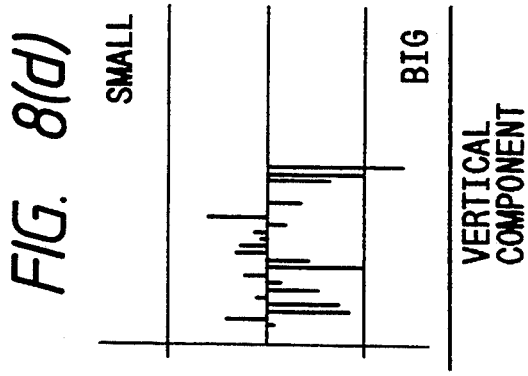
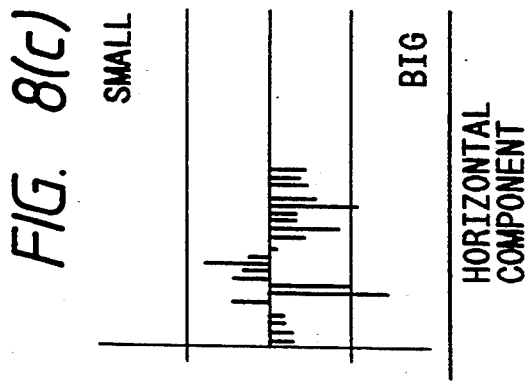

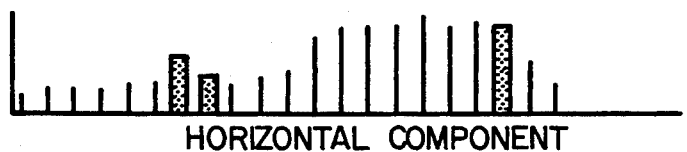
FIG. 9(a) HORIZONTAL COMPONENT
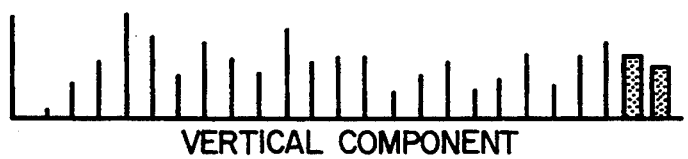
FIG. 9(b) VERTICAL COMPONENT
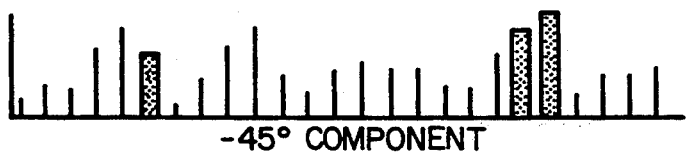
FIG. 9(c) −45° COMPONENT
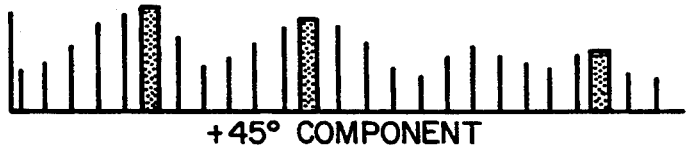
FIG. 9(d) +45° COMPONENT
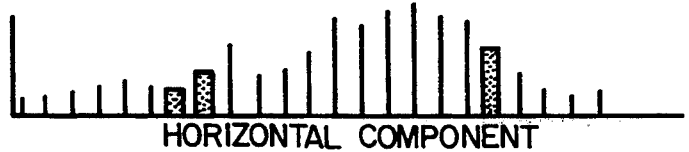
FIG. 9(e) HORIZONTAL COMPONENT
FIG. 9(f) VERTICAL COMPONENT
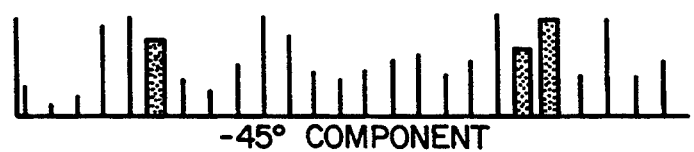
FIG. 9(g) −45° COMPONENT
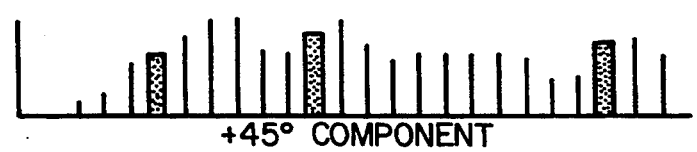
FIG. 9(h) +45° COMPONENT

INFORMATION MEDIUM RECOGNITION DEVICE

BACKGROUND OF THE INVENTION

1. Field of the Invention

This invention generally relates to an information medium recognition device and more particularly to a device for recognizing an information medium such as a handwritten signature inputted by what is called offline input operation, which is not connected to an online terminal or the like.

2. Description of The Related Art

A typical conventional character recognition device for recognizing a character input by what is called offline input operation, which is not connected to an online terminal or the like, is an optical character reader (OCR) which generally has a configuration illustrated in FIG. 11.

Namely, in the device of FIG. 11, a character handwritten on a recording medium such as paper is optically read by a scanner 1 and data representing the read character is generated. Subsequently, in a pre-processing portion 2, a process for eliminating the influence of the recording medium and noises or the like is performed on the data representing the handwritten character. The resultant data (hereunder sometimes referred to as handwritten character data) is stored in a storage portion 3.

Then, features (i.e., singularity points) are extracted from the handwritten character data, which is thus stored in the portion 3, by a feature extraction portion 4. Thus, data (hereunder sometimes referred to as singularity point data) representing the extracted feature is obtained by feature extraction portion 4. Namely, character information represents singularity points of each character. Further, each character can be identified by the combination of such singularity points. Therefore, the singularity point data representing features of a character to be recognized is stored in a dictionary portion 6. Then, in a comparison portion 5, the singularity point data representing the singularity point extracted by the feature extraction portion 4 is compared with the singularity point data stored in the dictionary portion 8 serially by performing, for instance, what is called a pattern matching method. Further, the character corresponding to one of the singularity point data stored in the portion 8, which data has a minimum error (namely, the stored singularity point data best agrees with the singularity point data representing the extracted singularity point) is judged to be the character read by the scanner 1. Then, data representing this result of the judgement is output through an output portion 7 and an output terminal 8 to an external device.

However, in such conventional character recognition device, objects to be recognized are characters which can be registered as what are called printing types. In contrast, in cases of handwritten characters such as signatures., there are differences in shape of each character among signers. Moreover, there are subtle differences among signatures written by a same person. Thus singularity point data corresponding to each of such characters cannot be uniquely set. Consequently, the conventional character recognition device has a drawback in that it is difficult to recognize handwritten characters, for example, signatures. The present invention is accomplished to eliminate such a drawback of the conventional device.

It is, accordingly, an object of the present invention to provide an information medium recognition device which can recognize an information medium such as a handwritten signature input by effecting what is called an offline input operation.

SUMMARY OF THE INVENTION

To achieve the foregoing object, in accordance with a first aspect of the present invention, there is provided an information medium recognition device for recognizing an information medium such as a handwritten signature input by performing an offline input operation, which comprises detection means for scanning the information medium in different scanning directions and for detecting a stroke density corresponding to each of the scanning directions, inference means for converting the stroke density into a compressed fuzzy cardinality (in the instant application, referred to as a fuzzy density) by performing a fuzzy inference process on the stroke density corresponding to each scanning direction, which is detected by the detection means, and judgement means for judging from the fuzzy density corresponding to each scanning direction whether or not the information medium is genuine.

Thus the inference means converts the stroke density into a compressed fuzzy density by performing a fuzzy inference process correspondingly to each scanning direction on the corresponding stroke density detected by the detection means. Then, judgement means judges on the basis of the fuzzy density corresponding to each scanning direction whether or not the information medium is genuine. As the result of the fuzzy inference performed by the inference means, the number of them can be decreased to that of fuzzy rules employed for effecting the fuzzy inference. Consequently, a vast amount of data representing the stroke densities can be compressed.

Further, in accordance with a second aspect of the present invention, there is provided an information medium recognition device for recognizing an information medium such as a handwritten signature input by performing an offline input operation, which comprises detection means for scanning the information medium (e.g., a handwritten signature) in different scanning directions and for detecting a stroke density corresponding to each of the scanning directions, inference means for performing a fuzzy inference according to and correspondingly to each of at least two kinds of membership functions, which are reciprocal in connection with a stroke interval, on the stroke density corresponding to each scanning direction, which is detected by the detection means, and for generating and adding up products of results of the inference and corresponding connection weight coefficients representing weights of scanning directions, respectively, and for outputting data representing certainty of the information medium (e.g., a signature), learning means for performing a learning control process on the connection weight coefficients by receiving a signal representing an operator's judgement on genuineness of the information medium (e.g., a signature) and for changing the connection weight coefficients according to the received signal and judgement means for judging from the data representing the certainty outputted by the inference means whether or not the information medium (e.g., a signature) is genuine, after the learning control processing is performed by the learning means.

Thus, the inference means performs a fuzzy inference according to and correspondingly to each of at least two kinds of membership functions, which are reciprocal in connection with a stroke interval, on the stroke density corresponding to each scanning direction, which is detected by the detection means. In addition, the inference means generates and adds up products of results of the inference and corresponding connection weight coefficients representing weights of scanning directions, respectively, and outputs data representing the certainty of the information medium (e.g., a signature). Further, learning means performs a learning control process on the connection weight coefficients by receiving a teaching signal representing an operator's judgement on the genuineness of the information medium (e.g., a signature) and for changing the connection weight coefficients according to the received signal. Then, judgement means judges from the data representing the certainty outputted by the inference means whether or not the information medium (e.g., a signature) is genuine, after the learning control processing is performed by the learning means. As the result of effecting the fuzzy inference processing on the basis of at least two kinds of the membership functions which are reciprocal concerning the stroke interval, not only data representing a part having a large stroke density but also data representing another part having a small stroke density can be utilized as data which represents the information medium and is used for recognizing the information medium (e.g., signature data). Thus data indicating the certainty of the information medium (e.g., a signature) can be outputted by the judgement means. Consequently, the device of the present invention has an excellent effect in that a information medium (e.g., a handwritten signature) can be accurately recognized and the genuineness thereof can be correctly judged.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 7(a) is a diagram illustrating an example of a signature;

FIGS. 7(b) to 7(e) are graphs each illustrating the distribution of the stroke density in each scanning direction to be obtained by a counting portion 210;

FIGS. 8(a) and 8(b) are diagrams each illustrating an example of a signature;

FIGS. 8(c) to 8(f) are graphs showing the distribution of the fuzzy density for illustrating fuzzy inference process to be performed in the fuzzy net portion 205 of FIG. 1;

FIGS. 9(a) to 9(h) are graphs illustrating an operation of a feature extraction to be performed by a feature extraction portion 207 of FIG. 1;

DETAILED DESCRIPTION OF THE PREFERRED EMBODIMENT

Hereinafter, the preferred embodiment of the present invention will be described in detail by referring to the accompanying drawings.

Figure 1:
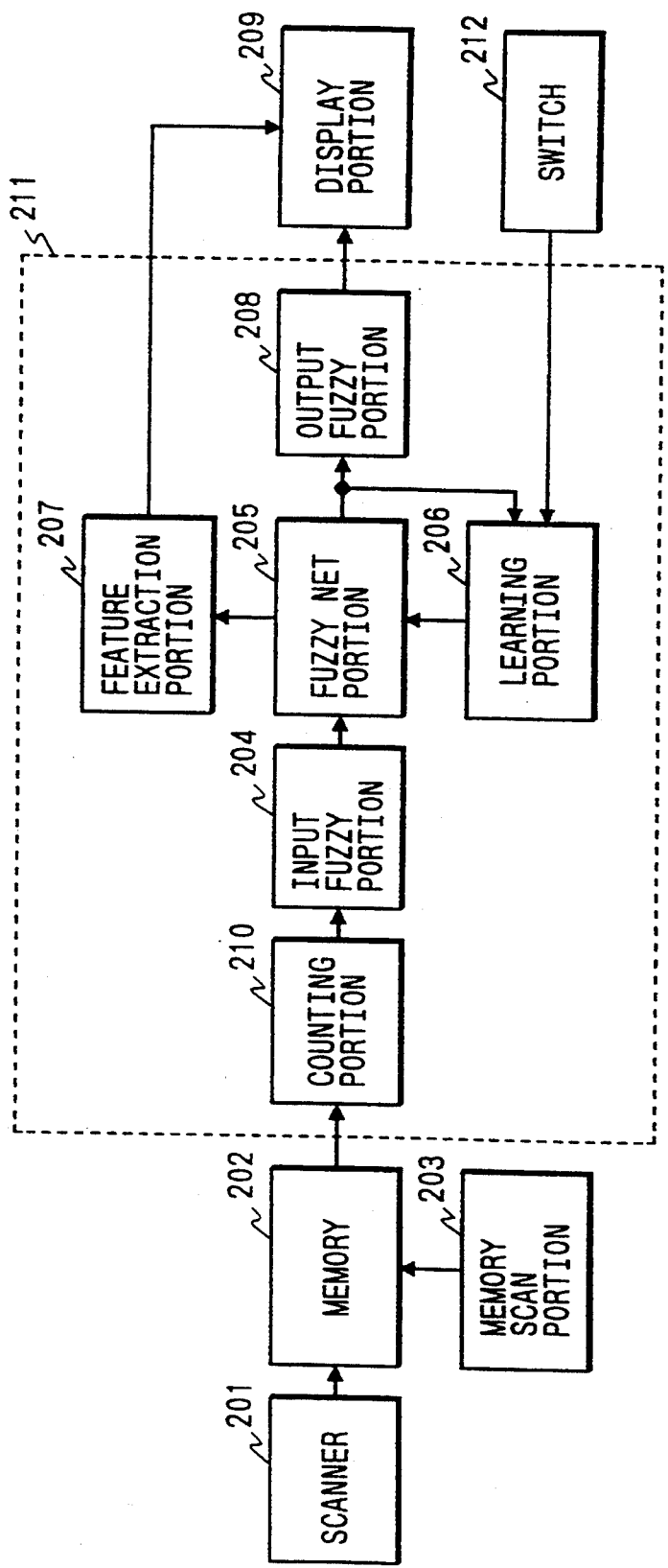
FIG. 1 is a schematic block diagram illustrating the configuration of an embodiment of the present invention.

FIG. 1 is a schematic block diagram illustrating the configuration of an embodiment of the present invention.

In the device of FIG. 1, a scanner 201 acts as a reading portion for optically reading a signature handwritten on a recording medium such as paper and for generating data (hereunder sometimes referred to as signature data) representing the read signature. Further, an ordinary optical reader incorporating, for instance, a line image sensor or a television (TV) camera is employed. Then, the signature data generated in the scanner 201 is transferred to a memory 202 which stores the signature data as two-dimensional image information illustrated in FIG. 7(a).

Figure 5:
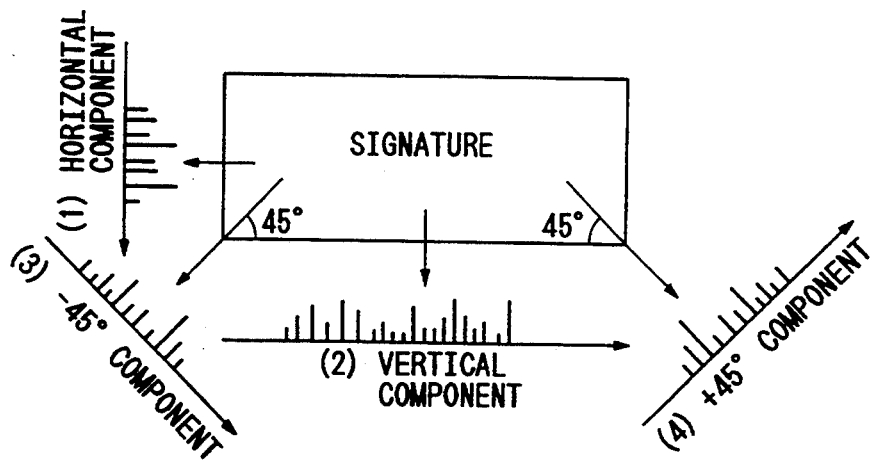
FIG. 5 is a diagram illustrating the direction in which signature data is scanned in a memory scanning portion 203 of FIG. 1.

A memory scan portion 203 accesses addresses, which are respectively assigned to pixels of the signature represented by the signature data stored in this memory 202, from various directions (hereunder sometimes referred to as scanning directions) illustrated in FIG. 5 and causes the memory 202 to output a signal representing data respectively stored at the accessed addresses thereof to a counting portion 210. As viewed in FIG. 5, in this embodiment, the memory scan portion 203 is a memory address generator for performing scans in (1) the horizontal direction, (2) the vertical direction, (3) the direction inclined ($-45$) degrees from the horizontal direction and (4) the direction inclined ($+45$) degrees from the horizontal direction, respectively. Incidentally, if the numbers of such scanning directions is increased further detailed data can be obtained.

Figure 6A:
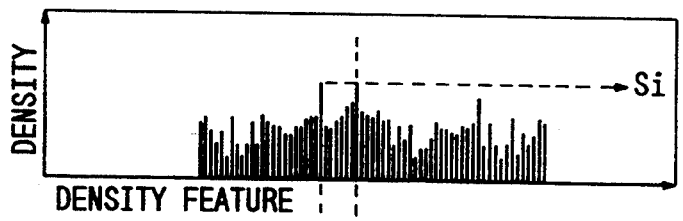
FIGS. 6(a), 6(b) and 6(c) are diagrams illustrating the process of fuzzy inference to be performed (hereunder sometimes referred to as a fuzzy inference process) in an input fuzzy portion 204 of FIG. 1.

The counting portion 210 counts points and lines composing the signature, which intersect a scanning line at the time of performing the scan, according to the signal outputted from the memory 202 as the result of the scan effected by the memory scan portion 203. Thus, the stroke densities in each scanning direction, in which the signature data is scanned, as shown in FIG. 6(a) can be obtained.

For example, where data representing the signature of FIG. 7(a) is stored in the memory 202, the stroke densities respectively corresponding to the scans effected in the horizontal directions, the vertical direction, the direction inclined (−45) degrees from the horizontal direction and the-direction inclined (+45) degrees from the horizontal direction are obtained as illustrated in FIGS. 7(b), 7(c), 7(d) and 7(e), respectively. (Incidentally, the combination of the scanner 201, the memory 202, the memory scan portion 203 and the counting portion 210 corresponds to the above described detection means of the first and second aspects of the present invention.)

Further, an input fuzzy portion 204 (corresponding to the above-mentioned inference means according to the first aspect of the present invention) is provided in this embodiment correspondingly with each scanning line used by the memory scan portion 203. Each input fuzzy portion 204 employs a triangle type (namely, A type) membership function as an internal function and converts the stroke densities of the signature data corresponding to each scanning direction into fuzzy densities.

Figure 2:
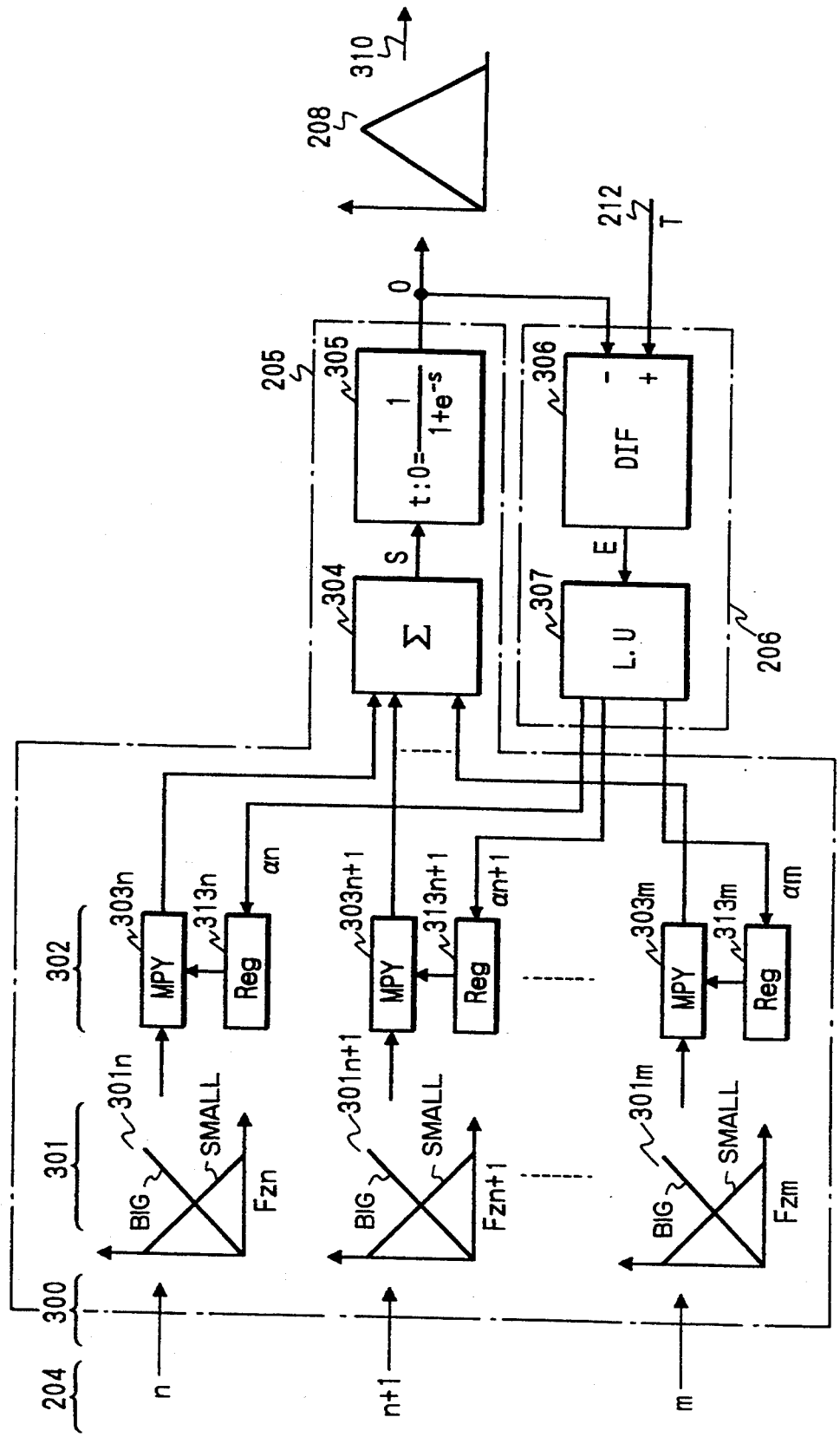
FIG. 2 is a block diagram illustrating the detail configurations of a fuzzy net portion 205 and a learning portion 206 of the embodiment of FIG. 1.
Figure 3:
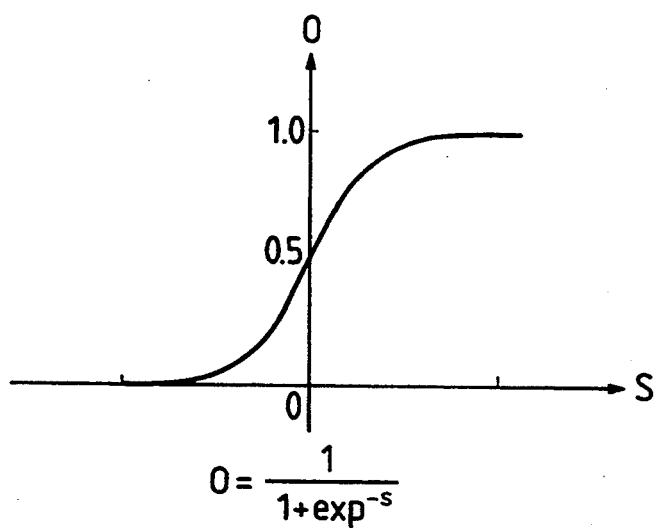
FIG. 3 is a graph illustrating the characteristic of a sigmoid function O employed by the fuzzy net portion 205 of FIG. 2.

Further, a fuzzy net portion 205 (corresponding to the above stated inference means according to the second aspect of the present invention) employs two kinds of membership functions (namely, Small and Big kinds) illustrated in FIG. 2 and a sigmoid function O indicating characteristics illustrated in FIG. 3 as internal functions. Moreover, the portion 205 performs a fuzzy inference process on the fuzzy density corresponding to each scanning direction, which is converted by the input fuzzy portion 4, and outputs data representing certainty of the input signature data.

Furthermore, a learning portion 206 (corresponding to the above stated learning means according to the second aspect of the present invention) operates during a learning operation the fuzzy net portion. Namely, the fuzzy net portion 205 sets connection weight coefficients α and works until the coefficients α converge on some values. Incidentally, output signals of this learning portion 206 are fed back to the fuzzy net portion 205 as signals representing the connection weight coefficients.

Additionally, a feature extraction portion 207 extracts a feature from a result of the fuzzy inference performed by the fuzzy net portion 205 and exhibits an image representing noticeable features or individualities extracted from a handwritten signature on the basis of the connection weight coefficients α, which are set according to a result of the learning effected by the fuzzy net portion 205. Namely, an image processing is performed on a characteristic portion of the handwritten signature representing the noticeable individualities by the feature extraction portion 207 and causes a display portion 209 to display data representing an image, which is generated as a result of the image processing and sent through an output fuzzy portion 208 thereto.

Further, the output fuzzy portion 208 (corresponding to judgement means according to the first and second aspect of the present invention) has a configuration similar to that of the input fuzzy portion 204. Moreover, the output fuzzy portion 208 judges whether the signature represented by the signature data inputted from the scanner 201 is genuine or false, by applying the fuzzy inference technique employed therein on an output from the fuzzy net portion 205.

Incidentally, the reason why the fuzzy inference technique is applied to the judgement on whether or not the signature is false is as follows. In case where a threshold or reference value is employed as a criterion of such a judgement (for instance, if the criterion is equal to or more than 0.9, the signature is genuine, but if equal to or less than 0.1, the signature is false), if an output of the fuzzy net portion is 0.3 or 0.89, the device may make an error in judgement due to a small difference in numerical value from the threshold. Namely, in case of applying a conventional threshold method to the judgement, there may occur a few errors in judgement. Therefore, to prevent the occurrence of such an error in judgement, the fuzzy inference technique is applied to the judgement on whether or not the signature represented by the signature data is false.

Further, a dot matrix liquid crystal display or a cathode ray tube (CRT) may be employed as the display portion 209. In case of this embodiment, the display portion 209 displays a result of the judgement on whether or not the signature represented by the signature data is false, as well as data representing what portion of the signature is a characteristic portion indicating individualities.

In addition, when the fuzzy net portion 205 is in a learning mode, an operator judges whether or not the judgement made by the output fuzzy portion 208 is correct. Then, the operator manipulates a switch 212 to give his judgement to the learning portion 208. Thereby, the degree of change in value of the connection weight coefficients α set in the learning portion 206 is determined.

Incidentally, the counting portion 210, the input fuzzy portion 204, the fuzzy net portion 205, the learning portion 206, the output fuzzy portion 208 and the feature extraction portion 207 are implemented according to programs to be executed in a central processing unit (CPU) 211.

Next, an operation of the entire device having the above described configuration will be described hereinbelow.

In case of the device of FIG. 1, when a signature handwritten on a recording medium such as paper is optically read by the scanner 201, signature data representing the read signature is generated therein and then the generated signature data is transferred therefrom to the memory 202. The memory 202 stores this signature data as data indicating two-dimensional image information, as illustrated in FIG. 7(a).

When the signature data is thus stored in the memory 202, the memory scan portion 203 scans addresses assigned respectively to pixels of an image (hereunder sometimes referred to as a signature image) of the signature represented by the signature data (namely, the two-dimensional image information), which is stored in the memory 202, in (1) the horizontal direction, (2) the vertical direction, (3) the direction inclined (−45) degrees from the horizontal direction and (4) the direction inclined (+45) degrees from the horizontal direction as viewed in FIG. 5. Further, each time a scanning line goes across the characters of the signature indicated by the two-dimensional image information, the memory scan portion 203 causes the memory 202 to output a signal.

Then, the counting portion 210 counts intersecting points and character lines at the time of scanning according to the signal outputted by the memory 202. Further, the counting portion 210 obtains the stroke density corresponding to each scanning direction as illustrated in FIG. 6(a). The horizontal axis in FIG. 6(a) corresponds to the scanning direction of the memory scan portion. The processing to be performed after that is effected by the CPU 211.

Figure 12:
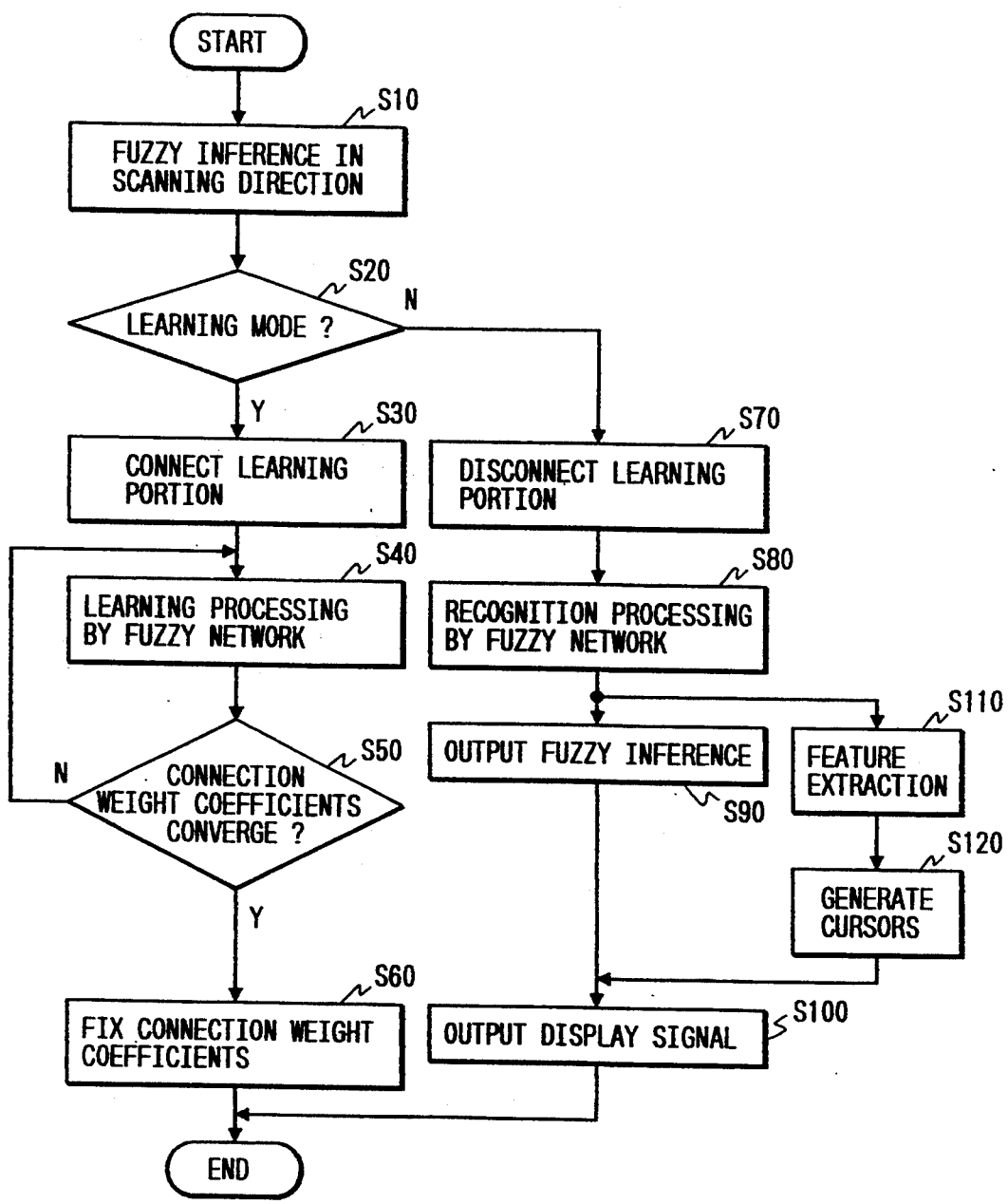
FIG. 12 is a flowchart illustrating an operation of a CPU 211 of FIG. 1.

As shown in a flowchart of FIG. 12 illustrating an operation of the CPU 211, the CPU 211 first performs a fuzzy inference process in each scanning direction and converts the stroke density of the signature data, which is obtained by the counting portion 10, into fuzzy density in step S10. This corresponds to an operation of the input fuzzy portion 204 of FIG. 1 and will be described in detail later.

Then, it is judged from a signal sent from a selection portion (not shown) in step S20 whether the device is currently in a recognition mode or a learning mode. If in the recognition mode, the program goes forward to step S70. If in the learning mode, the program advances to step S30.

If it is judged in step S20 that the device is in the learning mode, the learning portion 206 is connected with the fuzzy net portion 205 in step S30. Subsequently, a learning control operation is effected by a neural network and an established value of each of the connection weight coefficients α is changed in step S40. This corresponds to operations of the fuzzy net portion 205 and the learning portion 206 and will be described in detail later.

Further, in step S50, it is judged whether or not the value of the connection weight coefficient α converges and is fixed at a predetermined value. If judged to be fixed, the processing of step S40 is performed again. If judged as converging and fixed at a predetermined value, the program goes forward to step S60.

In step S60, the fixed values or when the connection weight coefficients α converge, are stored in registers 313n to 313m (to be described later) and a sequence of the learning processing is terminated.

On the other hand, if it is judged in step S20 that the device is in the recognition mode, the learning portion 206 is disconnected from the fuzzy net portion 205 in such a manner not to change the connection weight coefficients α. Incidentally, instead of this, a learning unit 307 may be disconnected from a register portion 313n. Alternatively, change in the connection weight coefficient $α_n$ used in the register 313n may be inhibited.

Subsequently, in step S80, a recognition processing is effected by a neural network and the certainty of the signature inputted by the scanner 201 is calculated. This corresponds to an operation of the fuzzy net portion 205 and will be described in detail later.

Next, in step S90, a fuzzy inference process is performed on the certainty of the inputted signature, which is calculated in step S80 and it is judged whether or not the inputted signature is false. Further, in step S100, a display signal representing the result of this judgement is outputted to the display portion 209 Whereupon data representing that the inputted signature is genuine or false is displayed. Thus, the sequence of the recognition processing is finished.

On the other hand, in step S110 which is effected in parallel with step S90, a characteristic portion of the signature inputted by the scanner 201, which includes individualities or individual features, is extracted on the basis of the result of the recognition processing effected by the neural network in step S80. This corresponds to an operation of the feature extraction portion 206 of FIG. 1 and will be described in detail later.

Further, in step S120, a cursor indicating the position of the characteristic portion in the inputted signature is generated according to the result of the extraction of the characteristic portion. Further, the inputted signature and the cursor are displayed on the display portion 209 by outputting the display signal representing the result of the extraction thereto. Thus, the sequence of the recognition is completed.

The operations of the entire device or embodiment have been described above. Hereinafter, the details of each operation of this embodiment will be described.

Figure 13:
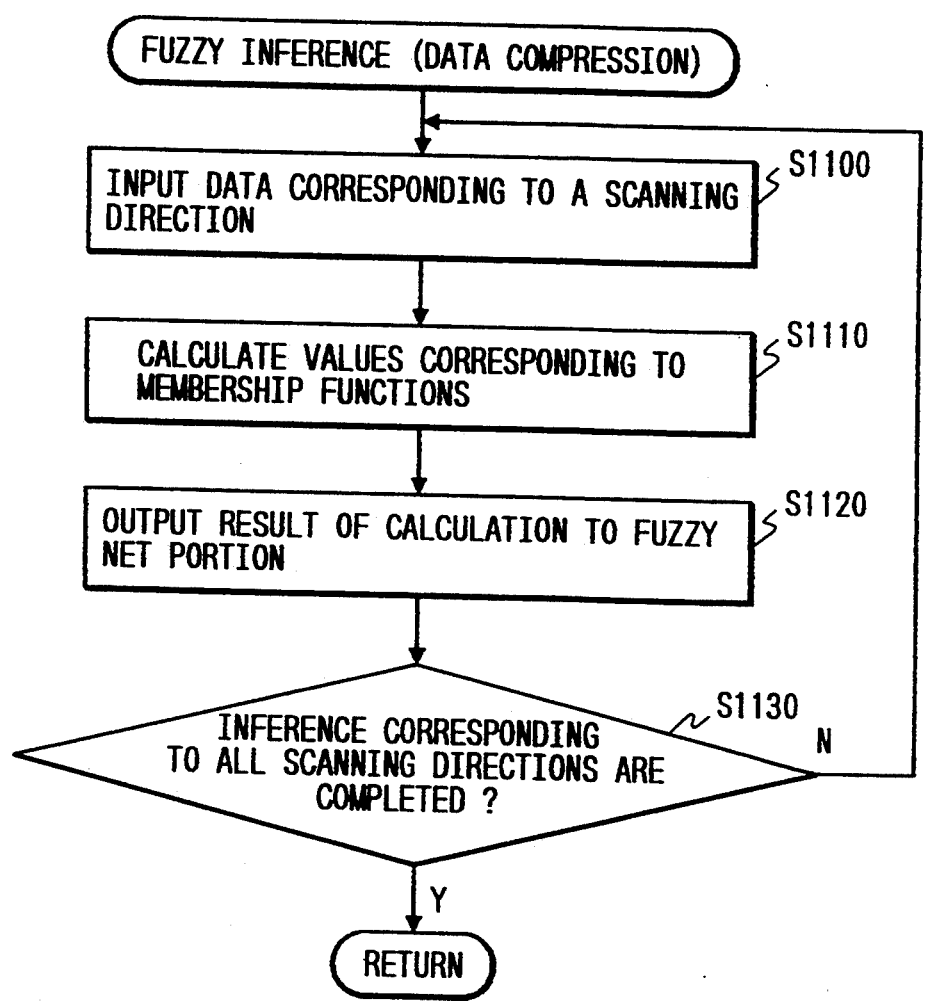
FIG. 13 is a flowchart illustrating an operation of the input fuzzy portion 204 of FIG. 1.

First, the operation of the input fuzzy portion 204 to be performed in step S10 will be described in detail hereinbelow. FIG. 13 is a flowchart for illustrating the operation of the input fuzzy portion 204. As shown in this figure, data representing the stroke density corresponding only to one scanning direction, which is obtained by the counting portion 210, is input to the input fuzzy portion 204 in step S1100.

Figure 6B:
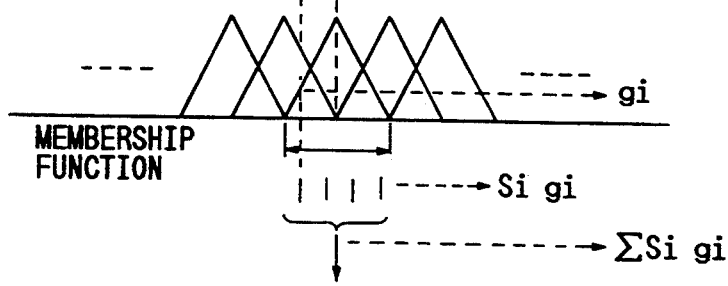
Figure 6C:
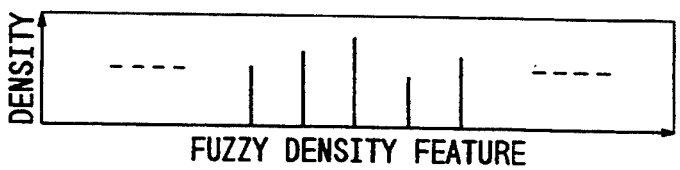

Subsequently, in step S1110, the input fuzzy portion 204 performs a fuzzy inference process by using the triangle type membership function of FIG. 6(b) incorporated therein. This fuzzy inference process is performed as follows. Namely, as illustrated in FIGS. 6(a) to 6(c), a coefficient gi corresponding to X-axis is first obtained by applying the triangle type membership function to a parameter Si. Then, in connection with each parameter Si, a product of the coefficient gi and the parameter Si is computed. Si indicates an ith stroke density, which corresponds to each of the lines illustrated in FIG. 6(a). The parameter gi represents a value (or height) of a triangle-type membership function. Subsequently, a sum of these products ($\Sigma$ Si gi) is calculated under the same triangle type membership function. Further, such a sum is similarly computed under each triangle type membership function. Thereby, the stroke density computed by the counting portion 210 is converted into fuzzy density as illustrated in FIG. 6(c).

This fuzzy inference process is performed for the following purpose. Namely, in the case of a handwritten-character elongated horizontally in general (for instance, a character of a signature), the number of data (especially, the stroke densities) is extremely large. This results in decreasing a processing speed in the subsequent recognition process.

Therefore, fuzzy rules are established in the input fuzzy portion 204 in such a manner that an output thereof is obtained correspondingly to a fuzzy rule. Further, the fuzzy inference process is performed on the stroke densities obtained by the counting portion 210 as illustrated in FIG. 6(a) under the triangle type membership functions illustrated in FIG. 6(b). Thereby, the large number of the data representing the stroke densities can be decreased to the number of the fuzzy rules established in the input fuzzy portion 204. Thus, the compression of the data representing the stroke densities can be achieved. Incidentally, in this case, the input fuzzy portions 204 of the number equal to that of the scanning directions are required. However, a single input fuzzy portion may be used repeatedly by performing the processing in a time sharing manner.

Furthermore, in step S1120, the result of the calculation corresponding only to a scanning direction, which is effected in step S1110, is outputted to the fuzzy net portion 205. Thereafter, it is judged in step S1130 whether or not the fuzzy inference processing corresponding to all of the scanning directions is completed. If not, the program returns to step S1100 in which the data corresponding to another scanning direction is inputted. If judged in step S1130 as completed, the program returns to a main routine or program of FIG. 12.

Figure 14:
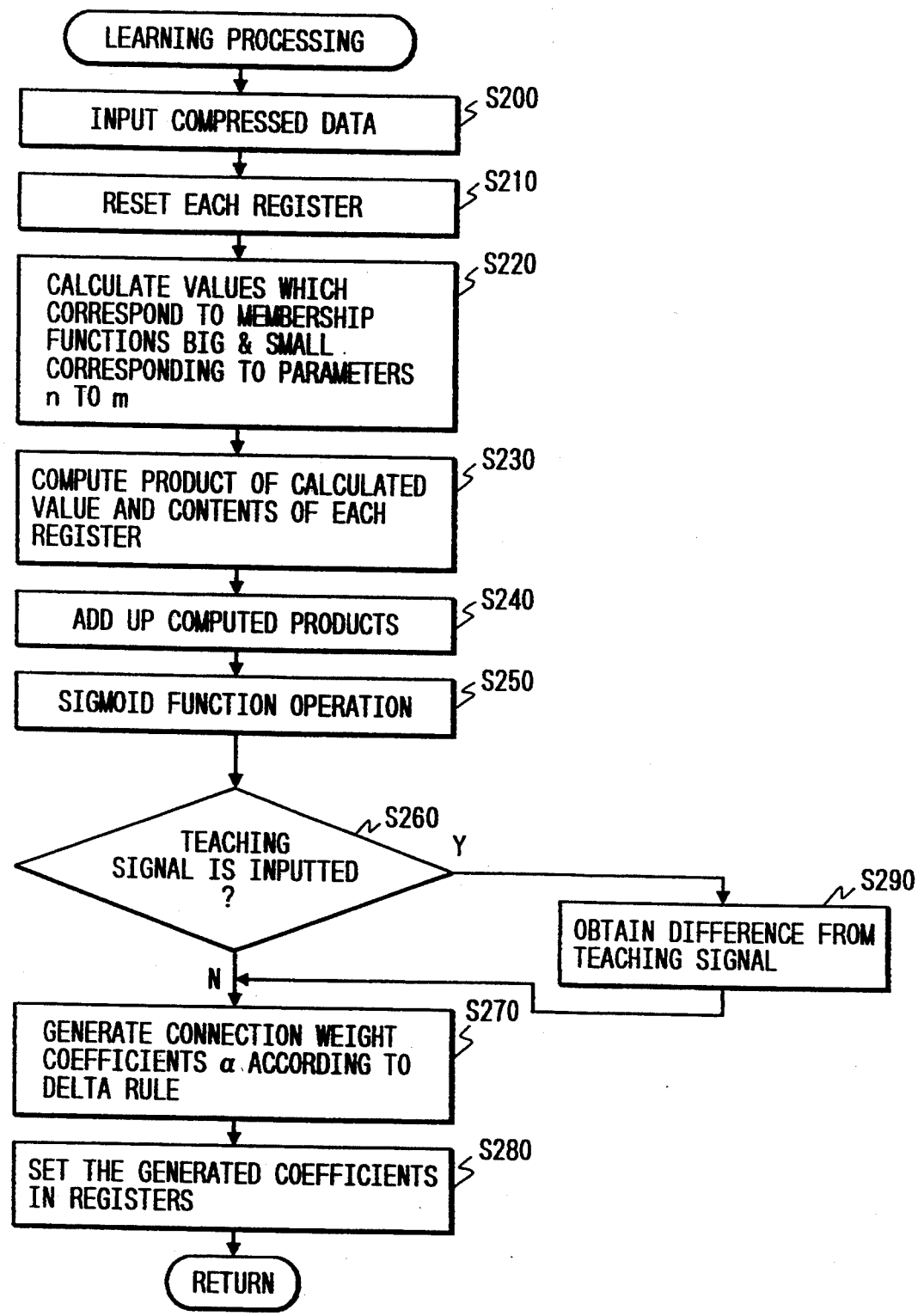
FIG. 14 is a flowchart illustrating learning operations to be performed by the fuzzy net portion 205 and the learning portion 206 of FIG. 1.

Next, the learning processing to be performed by the fuzzy net portion 205 and the learning portion 206 in step S40 will be described in detail hereinafter. FIG. 14 is a flowchart for illustrating the learning operation of the portions 205 and 206. FIG. 2 is a block diagram illustrating the detailed configuration of the portions 205 and 206.

As is seen from FIGS. 2 and 14, the data representing the fuzzy density corresponding to each scanning direction, which is compressed by the input fuzzy portion 203, is inputted in step S200. Further, the registers 313n to 313m are initialized or reset in step S210.

Here, note that as illustrated in FIG. 2, a fuzzy portion 301 is provided in an input layer of the fuzzy net portion 205. In subsequent step S220, the coefficients gi are obtained correspondingly to each of parameters n to m in the inputted fuzzy density by using both of two kinds of the membership functions (Small and Big) incorporated in the fuzzy portion 301.

As an example of results of such a calculation, results of the inference processes respectively corresponding to the scanning direction, which are performed in the fuzzy portion 301, in case of inputting the signature "Watanabe" shown in FIG. 8(a) are obtained as illustrated in FIGS. 8(c) to 8(f). Incidentally, FIGS. 8(c) to 8(f) correspond to the horizontal scanning direction, the vertical scanning direction, the scanning direction inclined (−45) degrees from the horizontal scanning direction and the scanning direction inclined (+45) degrees from the horizontal scanning direction, respectively. Further, data corresponding to the membership functions Big and Small are obtained in each scanning direction.

Here, note that the two kinds of the membership functions Big and Small are employed in order to know which of data respectively corresponding to a large density and a small density shows personal characteristics or features of the signature better. the membership function corresponds to a monotone increasing function and is represented by the oblique line "/". In contrast, the small membership function corresponds to a monotone decreasing function and is represented by the oblique line "\". Namely, not only a dense part having a large density but a sparse part having a small density is effective data. Therefore, the two kinds of the membership functions are employed to perform the recognition processing by effectively utilizing both of the dense part and the sparse part of the data.

Figure 4:
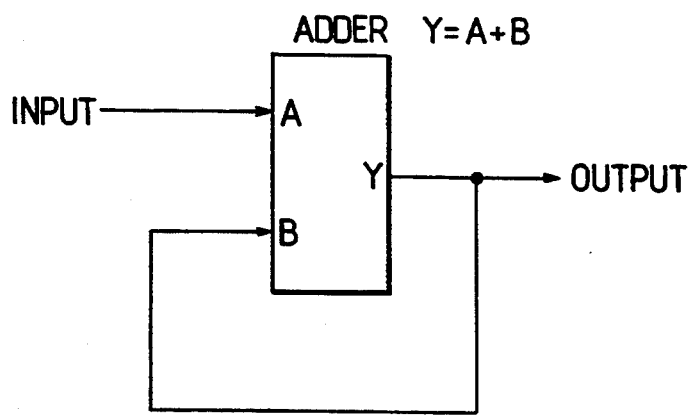
FIG. 4 is a circuit diagram illustrating the practical configuration of an addition portion 304 of FIG.

Further, in step S230, the connection weight coefficients an to am established in the registers 313n to 313m correspondingly to outputs (namely, sums of the products ($\Sigma$Si gi)) of the input fuzzy portion 204 are accumulated in accumulation portions 303n to 303m, respectively. In next step S240, the values obtained as the result of the accumulations are added in an addition portion 304. Incidentally, this addition portion 304 employs the configuration illustrated in FIG. 4.

Subsequently, in step S250, the result (hereunder sometimes referred to as the addition value) $\Sigma$ of the addition effected in the portion 304 is substituted into the sigmoid function O which is given by the following equation and has a characteristic curve illustrated in FIG. 3. Thus the corresponding certainty is computed. This sigmoid function is incorporated in an output portion 305. As is apparent from a characteristic diagram of FIG. 3, output values obtained from this sigmoid function range between 0 to 1. Namely, $$O = 1/(1 + exp^{-s})$$

where s designates the total sum $j\Sigma$ to be inputted to the output portion; and O an output of the neural network employed therein.

Here, a signer or operator manipulates the switch 212 to transmit to the learning portion 206 his judgement made on whether or not the inputted signature is false. At that time, in case where the inputted signature is genuine, a signal representing 1 is transmitted as a teaching signal (namely, a supervised learning signal) T. Further, in case where the inputted signature is false, a signal representing 0 is transmitted as the teaching signal. Then, it is judged in step S260 whether or not the teaching signal T is inputted. If inputted, the program advances to step S290. If not inputted, the program goes forward to step S270.

Incidentally, in step S290, a difference device 306 obtains a signal difference between a signal representing the output O of the fuzzy net portion 205 and the teaching signal T. The obtained signal difference is inputted to a learning unit 307. Further, in step S270 in which the learning portion 307 operates, a known steepest descent method (namely, a known delta rule) is performed or implemented. This steepest descent method is to generate the connection weight coefficients $\alpha$ outputted from the learning unit 307 in such a fashion to minimize the difference between the signal representing the output O of the fuzzy net portion 205 and the teaching signal T. In this embodiment, the learning operation is started by setting all of initial values of the connection weight coefficients $\alpha$ as 0. Incidentally, this learning operation is finished when a sum of squares of errors or differences between the outputs respectively corresponding to the genuine signature and the false one is equal to or less than, for instance, 0.1.

Subsequently, in step S280, the connection weight coefficients $\alpha n$ to $\alpha m$ calculated by the learning unit 307 are set in the registers n to m. Then, the program returns to the main routine of FIG.

Incidentally, as illustrated in FIG. 2, the fuzzy net portion 205 employs a two-layer perceptron consisting of an input layer 300 and an output layer (namely, an output portion 305) as a neural network, with the intention of facilitating the extraction of the features of the connection weight coefficients in the feature extraction to be performed by the feature extraction portion 207 (to be described later). Namely, as the result of employing the two-layer perceptron, the connection weight coefficients are set as one-dimensional ones. Thus the correlation among a large number of the connection weight coefficients can be disregarded. Consequently, the extraction of the characteristic portion according to the connection weight coefficients can be facilitated.

Figure 15:
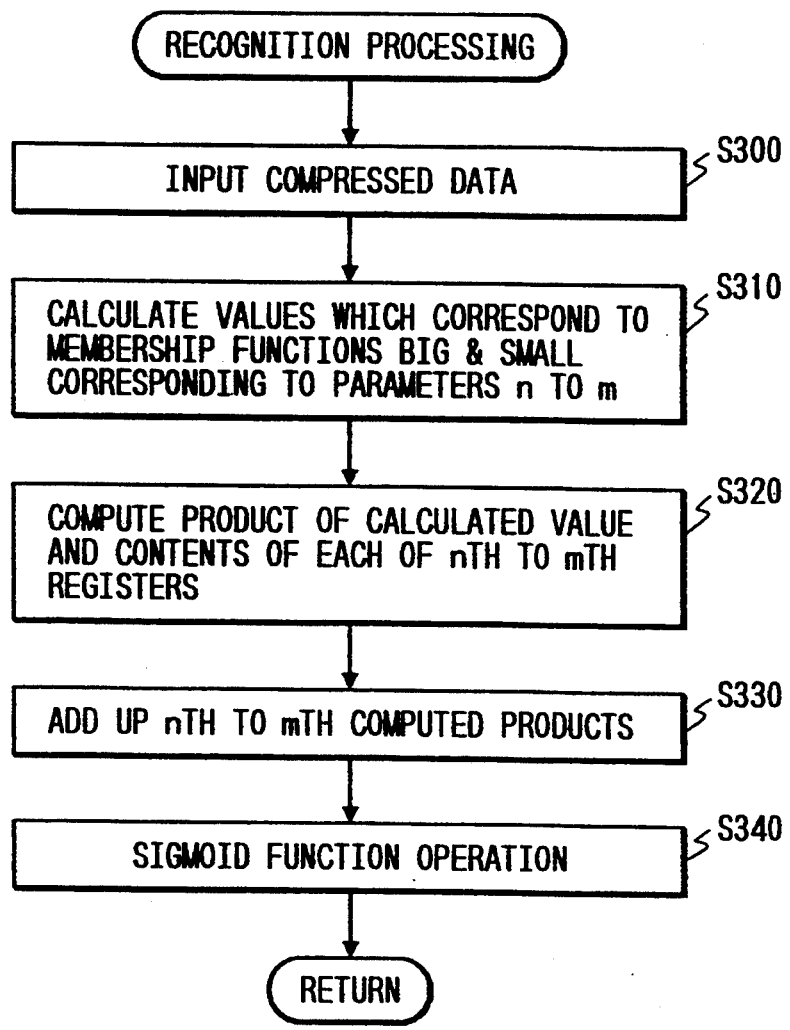
FIG. 15 is a flowchart illustrating a recognition operation to be performed by the fuzzy net portion 205 of FIG. 1.

Next, the recognition operation to be performed by the fuzzy net portion 205 in step S80 will be described in detail hereunder. FIG. 15 is a flowchart for illustrating the recognition operation to be performed by the portion 205.

As is seen from FIGS. 2 and 15, the fuzzy density corresponding to each scanning direction, which is compressed by the input fuzzy portion 204, is inputted in step S300.

As previously described, a fuzzy portion 301 is provided in an input layer of the fuzzy net portion 205 as shown in FIG. 2. In subsequent step S310, the coefficients gi are obtained correspondingly to each of parameters n to m in the inputted fuzzy density by using both of two kinds of the membership functions (Small and Big) incorporated in the fuzzy portion 301. Incidentally, the reason why the two kinds of the membership functions Big and Small are employed is that these membership functions are required to know which data respectively corresponding to a large density and a small density shows personal characteristics or features of the signature better. Namely, since a dense part having a large density, as well as a sparse part having a small density is effective data, the two kinds of the membership functions are employed to perform the recognition processing by effectively utilizing both of the dense part and the sparse part of the data.

Further, in step S320, the connection weight coefficients $an$ to $am$ established in the registers $313n$ to $313m$ (namely, the connection weight coefficients fixed as the result of the learning control operation) correspondingly to outputs (namely, sums of the products ($\Sigma Si.gi$)) of the input fuzzy portion 204 are accumulated in accumulation portions $303n$ to $303m$, respectively. In subsequent step S330, the values obtained as the result of the accumulations are added in an addition portion 304. Incidentally, as described above, the addition portion 304 employs the configuration illustrated in FIG. 4.

Next, in step S340, the addition value $\Sigma$ is substituted into the sigmoid function O which is given by the above described equation and has a characteristic curve illustrated in FIG. 3. Thus the corresponding certainty is computed. Incidentally, this sigmoid function O is incorporated in the output portion 305. Then, the program returns to the main routine of FIG. 12.

Additionally, in the learning and recognition processes performed by the fuzzy net portion 205, the operations of inputting the fuzzy densities corresponding to the scanning directions from the input fuzzy portion 204 are effected simultaneously. Instead of this, the processes may be performed by inputting the fuzzy density corresponding to a scanning direction and then outputting a result of the inference to the addition portion 304 and thereafter performing the same operations as these two steps on data corresponding to each of the other scanning directions.

Figure 16:
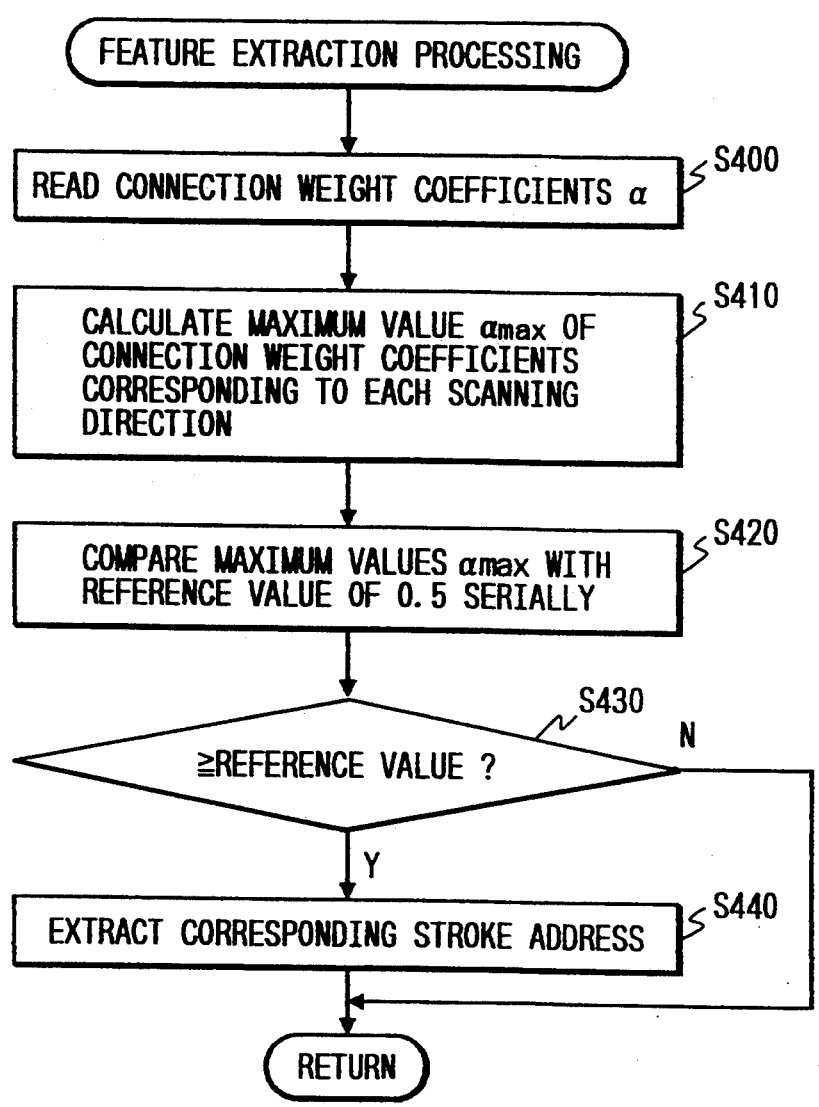
FIG. 16 is a flowchart illustrating an operation of the feature extraction portion 207 of FIG. 1.

Next, the operation to be performed by the feature extraction portion 207 in step S110 will be described in detail hereinbelow. FIG. 16 is a flowchart for illustrating the operation of the feature extraction portion 207.

As shown in this figure, the connection weight coefficients $a$ corresponding to the parameter n to m of the fuzzy density obtained correspondingly to each scanning direction are read from the registers $313n$ to $313m$ in step S400. Then, in step S410, the maximum value $amax$ of the connection weight coefficients $a$ corresponding to each scanning direction is obtained.

Subsequently, in the step S420 the maximum values $amax$ obtained respectively corresponding to scanning directions are serially compared with the value of 0.5 used for judgement. As the result of the comparison, it is judged in step S430 whether or not there is the maximum value $amax$ equal to or greater than the value of 0.5. If it is judged that there is no maximum value $amax$ equal to or greater than the value of 0.5, it is determined that the inputted signature has no characteristic portion and thus the signature is false. Thus nothing is displayed and the program returns to the main routine of FIG. 12.

In contrast, if it is judged that there is a maximum value $amax$ equal to or greater than the value of 0.5, the program advances to step S440 whereupon it is determined which of the scanning directions corresponds to this maximum value $amax$ and it is further determined which of the inputted stroke densities obtained in the determined scanning direction corresponds to this maximum value $amax$ of the connection weight coefficients. Thereby, it is furthermore determined which of the addresses of the pixels of the image of the signature represented by the two-dimensional signature data corresponds to the maximum value $amax$. Thereafter, the program returns to the main routine of FIG. 12.

Then, in the main routine of FIG. 12, the operations of generating the cursor in step S120 and generating the display signal in step S100 are carried out by using the determined scanning direction and address.

As the result of this feature extraction or detection process, parameters representing fuzzy densities and personal characters are obtained as illustrated in FIGS. 9(a) to 9(h), for example, in case where the signatures of FIGS. 8(a) and 8(b) are inputted. Incidentally, in FIGS. 9(a) to 9(h), thick bars indicate parameters representing noticeable personal characteristics. Further, FIGS. 9(a) to 9(d) illustrate the distributions of the fuzzy densities corresponding to the genuine signature of FIG. 8(a) and on the other hand FIGS. 9(e) to 9(h) illustrate the distributions of the fuzzy densities corresponding to the false signature of FIG. 8(b).

As is apparent from FIGS. 9(a) to 9(h), the distributions of the fuzzy densities of FIGS. 9(a) to 9(d) corresponding to the genuine signature are largely different from the corresponding distributions of the fuzzy densities of FIGS. 9(e) to 9(h) corresponding to the false signature. Further, the positions of the thick bars (especially representing personal characteristics) in the horizontal axis of each of FIGS. 9(a) to 9(d) are rather different from those of the thick bars (especially representing personal characteristics) in the horizontal axis of each of FIGS. 9(e) to 9(h).

Figure 10A:
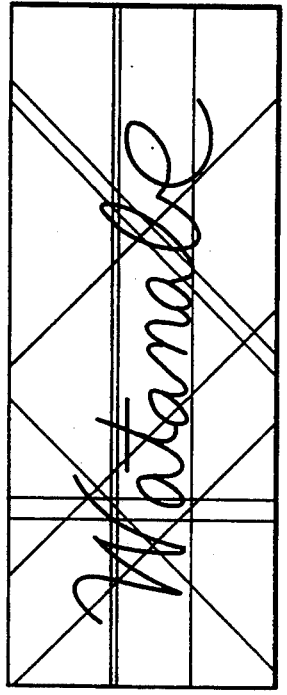
FIGS. 10(a) to 10(d) are graphs each illustrating the indication of a result of an extraction performed by the portion 207 of FIG. 2.
Figure 10B:
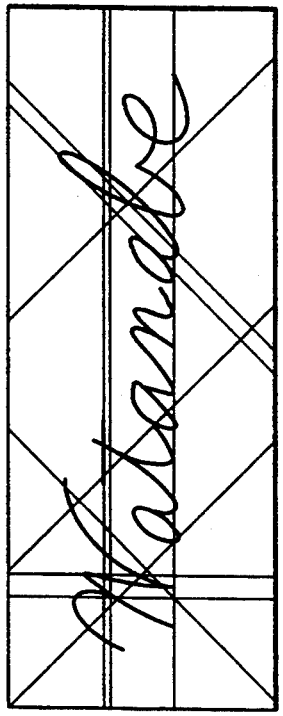
Figure 10C:
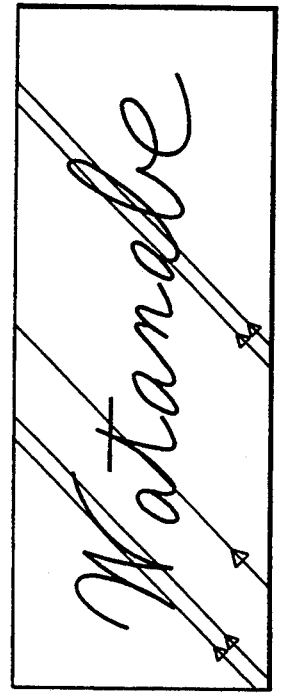
Figure 10D:
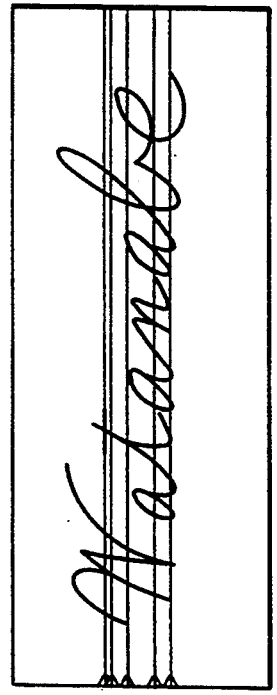
Figure 11:
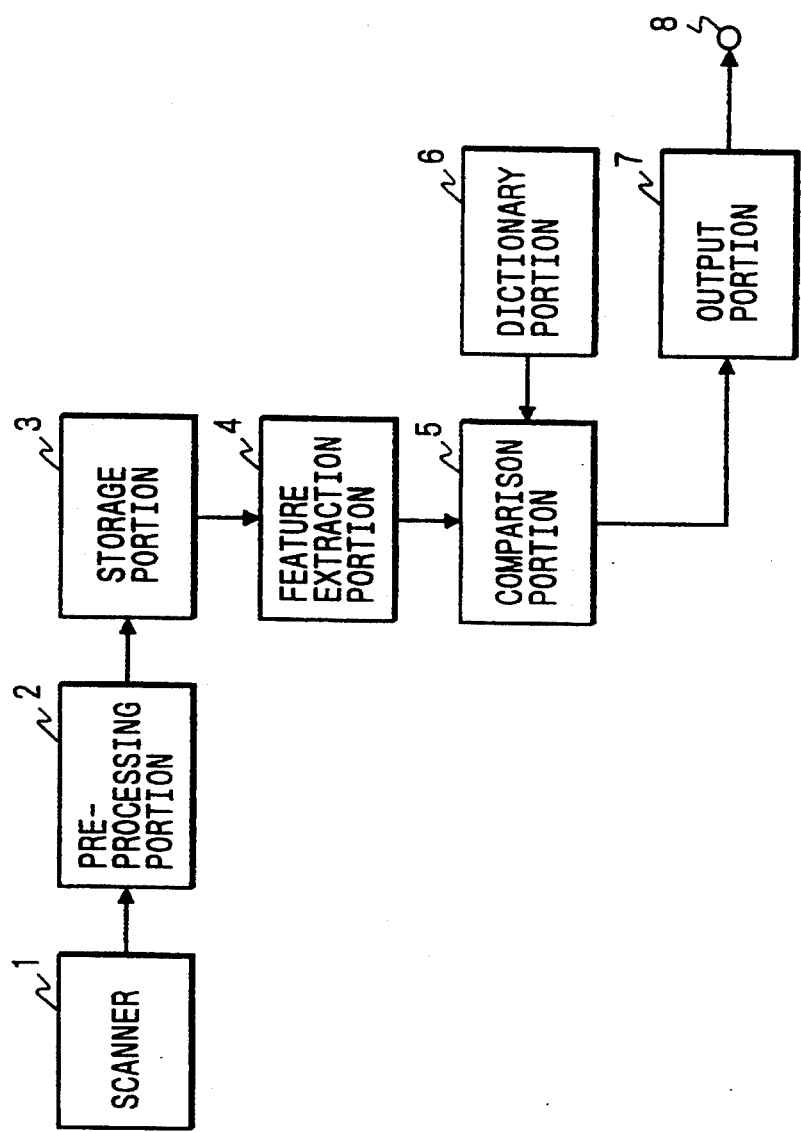
FIG. 11 is a schematic block diagram illustrating the configuration of a conventional OCR.

Moreover, examples of such a characteristic portion displayed on the display portion 209 are illustrated in FIGS. 10(a) to 10(d). FIGS. 10(a) and 10(b) illustrate examples in which approximate positions of characteristics are indicated by the cursors. FIGS. 10(c) and 10(d) illustrate examples in which detailed or precise positions of characteristics are indicated by the cursors of the limited number.

Incidentally, the display of the characteristic portion of the signature is significant when there is a demand for visualizing the characteristic portion of the signature (for instance, when giving an expert opinion on a handwritten signature). In contrast, in case where it is sufficient for a user to simply display the result of the judgement on whether or not the signature is genuine, it is not preferable from a security point of view to display the characteristic portion of the signature on the display portion. Thus, in such a case, the operations of steps S110 and S120 of the main routine of FIG. 12 may be omitted.

As described above, in case of this embodiment of the present invention, the number of data representing a large number of the stroke densities can be decreased to the number of the fuzzy rules employed in the input fuzzy portion 204 by performing the fuzzy inference on the stroke densities of the signature data representing the inputted handwritten signature. Thus, the compression of the data representing the stroke densities can be achieved.

Furthermore, the recognition processing is performed on the obtained data by utilizing the learning function of the fuzzy net. Thereby, good recognition precision can be obtained.

Further, regarding the extraction of the characteristic portion of the handwritten signature, the connection weight coefficients $\alpha$ are used. In addition, for the purpose of facilitating the extraction of the features of the connection weight coefficients, the two-layer perceptron is employed as the fuzzy net portion 205. As the result of employing the two-layer perceptron, the connection weight coefficients are set as one-dimensional ones. Thus, the extraction of the feature or characteristic portion according to the connection weight coefficients can be easily achieved.

Further, the result of the recognition with higher precision can be obtained by performing the fuzzy inference on the certainty of the signature, which is outputted by the fuzzy net portion 205.

Incidentally, in the output fuzzy portion 208, the certainty of the recognition may be determined by judging how the output data of the output unit 305, which correspond to the scanning directions, respectively, are combined with one another.

Namely, if the inference is performed on the fuzzy density corresponding only to one scanning direction, the result of the recognition may greatly vary with scanning directions due to, for instance, the slant of the handwritten signature and the condition of a pen used to write the signature and the kind of the used pen (e.g., a fountain pen, a mechanical pencil, a felt-tip pen). Even in such a case, a good result of the recognition can be obtained by combining the uncertainties respectively corresponding to the scanning directions with one another.

Further, in case of the aforesaid embodiment of the present invention, the two kinds of the membership functions Small and Big are employed in the fuzzy net portion 205. However, the larger the number of kinds of employed membership functions (thus, the number of employed fuzzy rules) becomes, the higher the capability of recognizing or judging a signature becomes.

Moreover, the membership functions are not limited to those of the triangle type. However, in case where the neural network comprised of a two-layer perceptron as of the above described embodiment of the present invention is employed, it is necessary for ensuring the learning function to make the fuzzy portion of the input layer of the neural network function as linearization means.

Additionally, it is not necessary to incorporate the scanner 201 into the signature recognition device of the present invention. For example, signature data representing a handwritten signature can be read in a distant place. Further, image data representing the read signature data may be transferred by a facsimile system to the signature recognition device and then the transmitted data may be used in the device and stored in the memory.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An information medium recognition device for recognizing an information medium inputted by performing an offline input operation, the information medium recognition device comprising:

detection means for scanning the information medium in different scanning directions and for detecting stroke densities corresponding to each of the scanning directions;

inference means for converting the stroke densities in each scanning direction into compressed fuzzy densities by performing a fuzzy inference process on the stroke densities corresponding to each scanning direction, which are detected by the detection means, wherein the number of fuzzy densities in each scanning direction is less than the number of the corresponding stroke densities and is equal to a number of fuzzy rules preliminarily established in the inference means for converting the stroke densities into the compressed fuzzy densities; and judgement means for judging from the compressed fuzzy densities corresponding to each of the scanning directions whether or not the information medium is genuine.

2. The information medium recognition device according to claim 1, wherein the detection means comprises:

reading means for reading the information medium;

storage means for storing two-dimensional data representing the information medium as read by the reading means; and storage scan means for scanning the data stored in the storage means in different scanning directions and for detecting stroke densities corresponding to each of the scanning directions.

3. The information medium recognition device according to claim 1, wherein the judgement means comprises:

learning means for performing a learning control processing on connection weight coefficients representing weights of scanning directions by receiving a signal corresponding to a genuineness of the information medium and for changing the connection..weight coefficients according to the received signal;

certainty inference means for receiving the connection weight coefficients and for performing a fuzzy inference on the compressed fuzzy densities corresponding to each of the scanning directions, the fuzzy inference being performed according to each of at least two kinds of membership functions, wherein the membership functions are respectively proportional to and inversely proportional to a stroke interval, the certainty inference means also adding values produced by the fuzzy inference to the connection weight coefficients and outputting data representing a certainty of the information medium; and genuineness judgement means for judging from the data representing the certainty outputted by the certainty inference means whether or not the information medium is genuine.

4. The information medium recognition device according to claim 3, wherein the genuineness judgement means judges whether or not the information medium is genuine, by performing a fuzzy inference processing on the data indicating certainty of the information medium, which data is outputted by the certainty inference means.

5. The information medium recognition device according to claim 3, wherein the genuineness judgement means consists of a two-layer perceptron having an input layer and an output layer.

6. The information medium recognition device according to claim 3, which further comprises;
   extraction means for extracting personal characteristics in the information medium based on the connection weight coefficients received by the certainty inference means; and
   display means for displaying the information medium and a result of an extraction performed by the extraction means.

7. The information medium recognition device according to claim 1, wherein the information medium is a signature.

8. An information medium recognition device for recognizing an information medium inputted by performing an offline input operation, the information medium recognition device comprising:
   detection means for scanning the information medium in different scanning directions and for detecting stroke densities corresponding to each of the scanning directions;
   learning means for performing a learning control processing on connection weight coefficients representing weights of scanning directions by receiving a signal corresponding to genuineness of the information medium and for changing the connection weight coefficients according to the received signal;
   inference means for receiving the connection weight coefficients and for performing a fuzzy inference on the stroke densities corresponding to each of the scanning direction detected by the detecting means, the fuzzy inference being performed according to each of at least two kinds of membership functions, wherein the two kinds of membership functions are respectively proportional to and inversely proportional to a stroke interval, the inference means also adding values produced by the fuzzy inference to the received connection weight coefficients and outputting data representing a certainty of the information medium; and
   judgement means for judging from the data representing the certainty output by the inference means whether or not the information medium is genuine.

9. The information medium recognition device according claim 8, wherein the detection means comprises:
   reading means for reading the information medium;
   storage means for storing the information medium read by the reading means as two-dimensional data; and
   storage scan means for scanning the two-dimensional data stored in the storage means in different scanning directions and for detecting a stroke density corresponding to each scanning direction.

10. The information medium recognition device according to claim 8, wherein the judgement means judges whether or not the information medium is genuine, by performing a fuzzy inference processing on the data representing certainty of the information medium data, which data is outputted by the inference means.

11. The information medium recognition device according to claim 8, wherein the inference means consists of a two-layer perceptron having an input layer and an output layer.

12. The information medium recognition device according to claim 8, which further comprises:
   extraction means for extracting personal characteristics in the information medium based on the connection weight coefficients received by the certainty inference means; and
   display means for displaying the information medium and a result of an extraction performed by the extraction means.

13. The information medium recognition device according to claim 8, wherein the information medium is a signature.

14. An information medium recognition device for recognizing an information medium inputted by performing an offline input operation, the information medium recognition device comprising:
   detection means for scanning the information medium in different scanning directions and for detecting stroke densities corresponding to each of the scanning directions;
   inference means for converting the stroke densities in each scanning direction into compressed fuzzy densities by performing a fuzzy inference process on the stroke densities corresponding to each scanning direction, which are detected by the detection means; and
   judgement means for judging from the fuzzy densities corresponding to each scanning direction whether or not the information medium is genuine, wherein the judgement means comprises:
   learning means for performing a learning control processing on connection weight coefficients representing weights of scanning directions by receiving a signal corresponding to genuineness of the information medium and for changing the connection weight coefficients according to the received signal;
   certainty inference means for receiving the correction weight coefficients and for performing a fuzzy inference on the compressed fuzzy densities corresponding to each of the scanning directions, the fuzzy inference being performed according to each of at least two kinds of membership functions, wherein the membership functions are respectively proportional to and inversely proportional to a stroke interval, the certainty inference means also adding values produced by the fuzzy inference to the connection weight coefficients and outputting data representing certainty of the information medium;
   genuineness judgement means for judging from the data representing the certainty outputted by the certainty inference means whether or not the information medium is genuine;
   extraction means for extracting personal characteristics in the information medium based on the connection weight coefficients received by the genuine inference means; and
   display means for displaying the information medium and a result of an extraction performed by the extraction means, wherein the extraction means obtains a maximum value of the connection weight coefficients corresponding to each scanning direction and then compares the maximum values with a predetermined value and wherein if one of the maximum values is equal to or greater than the predetermined value, it is determined that the inputted information medium has a characteristic portion.

15. An information medium recognition device for recognizing an information medium inputted by performing an offline input operation, the information medium recognition device comprising:.

detection means for scanning the information medium in different scanning directions and for detecting stroke densities corresponding to each of the scanning directions;

learning means for performing a learning control processing on connection weight coefficients representing weights of scanning directions by receiving a signal corresponding to genuineness of the information medium and for changing the connection weight coefficients according to the received signal;

inference means for receiving the connection weight coefficients and for performing a fuzzy inference on the stroke densities corresponding to each of the scanning directions detected by the detecting means, the fuzzy inference being performed according to each of at least two kinds of membership functions, wherein the two kinds of membership functions are respectively proportional to and inversely proportional to a stroke interval, the inference means also adding values produced by the fuzzy inference to the received connection weight coefficients, and outputting data representing a certainty of the information medium;.

judgement means for judging from the data representing the certainty outputted by the inference means whether or not the information medium is genuine;

extraction means for extracting personal characteristics in the information medium based on the connection weight coefficients received by the genuine inference means; and display means for displaying the information medium and a result of an extraction performed by the extraction means, wherein the extraction means obtains a maximum value of the connection weight coefficients corresponding to each scanning direction and then compares the maximum values with a predetermined value and wherein if one of the maximum values is equal to or greater than the predetermined value, it is determined that the inputted information medium has a characteristic portion.

16. An information medium recognition device for recognizing an information medium inputted by performing an offline input operation, the information medium recognition device comprising:

detection means for scanning the information medium in different scanning directions and for detecting stroke densities corresponding to each of the scanning directions;

inference means for converting the stroke densities which are detected by the detection means in each scanning direction into compressed fuzzy densities by performing a fuzzy inference process on the stroke densities corresponding to each scanning direction; and judgement means for judging from the fuzzy densities corresponding to each scanning direction whether or not the information medium is genuine, wherein the judgement means comprises:

learning means for performing a learning control processing on connection weight coefficients representing weights of scanning directions by receiving a signal corresponding to genuineness of the information medium and for changing the connection weight coefficients according to the received signal;

certainty inference means for receiving the connection weight coefficients and for performing a fuzzy inference on the compressed fuzzy densities correspondingly each of the scanning directions, the fuzzy inference being performed according to each of at least two kinds of membership functions, wherein the membership functions are respectively proportional to and inversely proportional to a stroke interval, the certainty inference means also adding values produced by the fuzzy inference to the received connection weight coefficients and outputting data representing certainty of the information medium; and genuineness judgement means for judging from the data representing the certainty outputted by the certainty inference means whether or not the information medium is genuine, wherein the genuineness judgement means judges whether or not the information medium is genuine, by performing a fuzzy inference processing on the data indicating certainty of the information medium, which data is outputted by the certainty inference means.

17. An information medium recognition device for recognizing a handwritten information medium, the information medium recognition device comprising:

detection means for scanning the handwritten information medium in different scanning directions and for detecting stroke densities corresponding to each of the scanning directions;

inference means for converting the stroke densities, which are detected by the detection means in each of the scanning directions, into compressed fuzzy densities by performing a fuzzy inference process on the stroke densities corresponding to each scanning direction, the number of fuzzy densities in each scanning direction being less than the number of the stroke densities in that scanning direction and equal to the number of fuzzy rules preliminarily established in the inference means; and judgement means for judging from the fuzzy densities corresponding to each scanning direction whether or not the handwritten information medium is genuine.

* * * * *